Feb. 27, 1968 F. J. BOODY 3,370,811
AIRCRAFT LAUNCHING MECHANISM
Filed Dec. 23, 1965 3 Sheets-Sheet 1

INVENTOR
FREDERICK J. BOODY

BY Claude Funkhouser
ATTORNEY
Neal E. Abrams
AGENT

Feb. 27, 1968   F. J. BOODY   3,370,811
AIRCRAFT LAUNCHING MECHANISM
Filed Dec. 23, 1965   3 Sheets-Sheet 3
FIG. 4
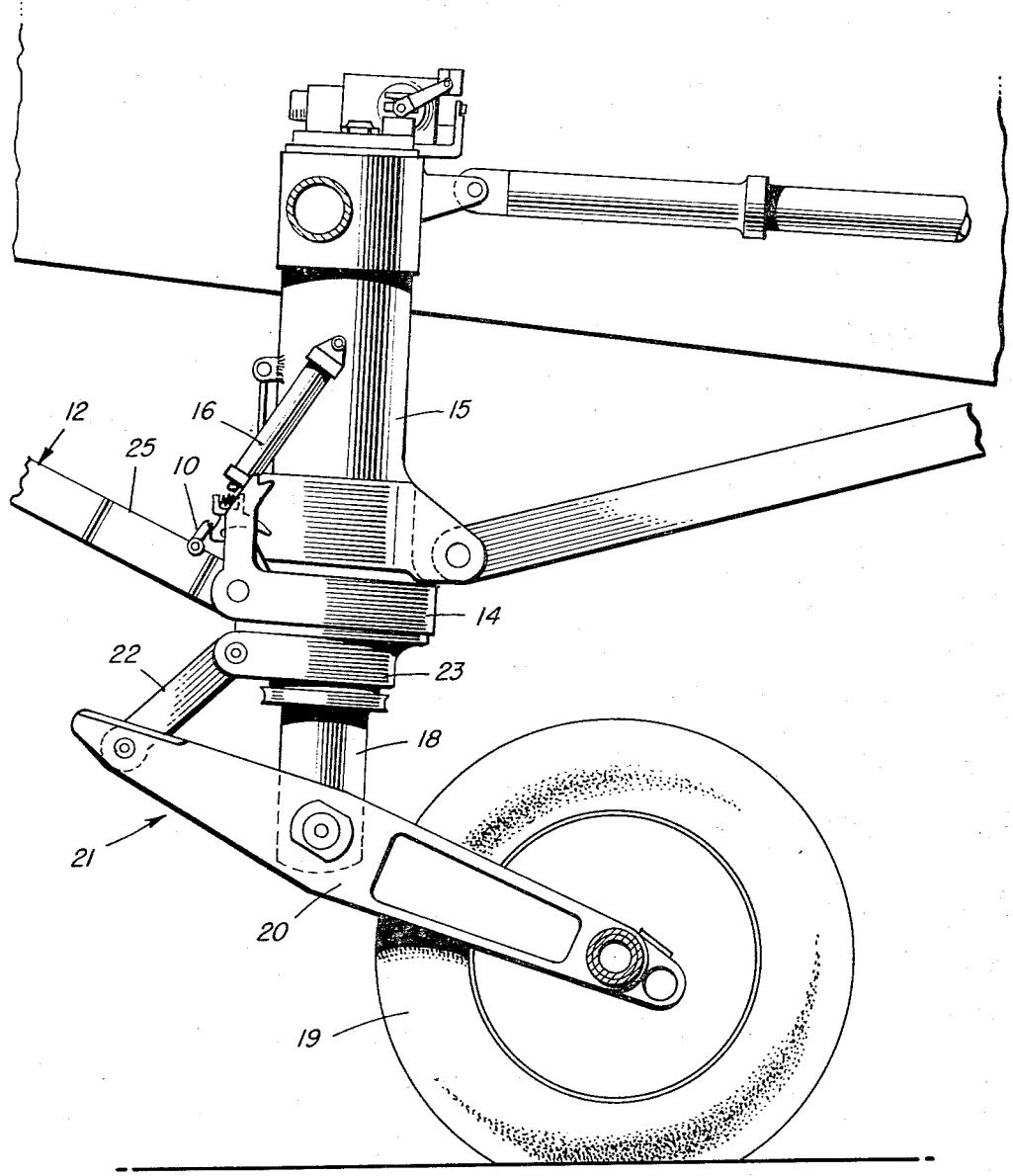
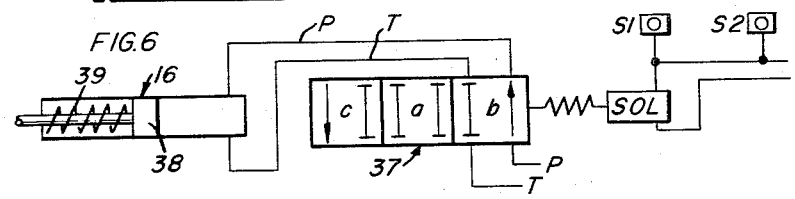

United States Patent Office 3,370,811
Patented Feb. 27, 1968

1

3,370,811
AIRCRAFT LAUNCHING MECHANISM
Frederick J. Boody, Irving, Tex., assignor, by mesne assignments, to the United States of America as represented by the Secretary of the Navy
Filed Dec. 23, 1965, Ser. No. 516,161
6 Claims. (Cl. 244—63)

ABSTRACT OF THE DISCLOSURE

There is disclosed a launch bar for coupling a catapult shuttle to the nose gear of an aircraft. The bar is biased upward to a stowed position in which the wheel can be steered independently of the bar. A hydraulic cylinder lowers the bar for engagement with the shuttle, thereby locking the wheel so it will follow the rotation of the bar.

This invention relates to catapult launching systems and more particularly to devices for coupling the aircraft to the catapult shuttle.

The launching systems employed on aircraft carriers today usually include a steam catapult having one or more cylinders installed below deck and one or more pistons arranged to accelerate a shuttle along the deck. The aircraft is attached to this shuttle by means of a bridle which hooks over the shuttle and through which the launching load is exerted. Full catapult launching power is insured by temporarily restraining the aircraft with a holdback cable that secures it to the carrier deck. When full catapult power is reached, the holdback is released and the aircraft is catapulted forward, pulled by the shuttle. The steps of positioning the aircraft over the shuttle and securing the tow and holdback cables slow up launching to the point where it is a discontinuous, inefficient operation. The instant invention provides launching and holdback gear designed around the nose landing gear of the aircraft, including a launch bar which attaches to the catapult shuttle and a holdback bar which attaches to the carrier deck, both of these bars being afixed to the nose wheel strut. The launch bar is designed so that it may be raised to a stowed position in which it is entirely away from the swivelable nose wheel, but can be lowered by the pilot to a position where it engages and steers the nose wheel of the aircraft and coacts with guide bars on the flight deck to steer the aircraft into position for launch on the catapult in addition to engaging the catapult shuttle. After launch, the launch bar retracts with the forward gear and returns automatically to a stowed position.

It is an object of this invention to provide a new and improved launching and holdback means for catapulting aircraft.

A further object of this invention is to provide a launching and holdback means for an aircraft in which the entire structure is centered around the forward nose gear.

Another object of this invention is to provide a catapult means for an aircraft in which there is provided a means for guiding the aircraft into position on the catapult.

Still another object of this invention is to provide a nose gear catapult system in which the launch bar does not interfere with the caster action of the swivelable nose wheel when it is in the stowed position.

Another object of this invention is to provide a nose gear catapult system for an aircraft wherein the launch bar is automatically retracted and stowed after use.

Other objects, advantages and novel features of the present invention will become apparent from the following detailed description when considered in conjunction with the accompanying drawings wherein:

FIG. 4 is a detailed showing of the attachment of the launch bar to the aircraft gear structure;

FIG. 5 is a detailed showing of the engagement of the launch bar with the gear structure; and FIG. 6 is a schematic of the controls for the launch bar lowering mechanism.

Figure 1:
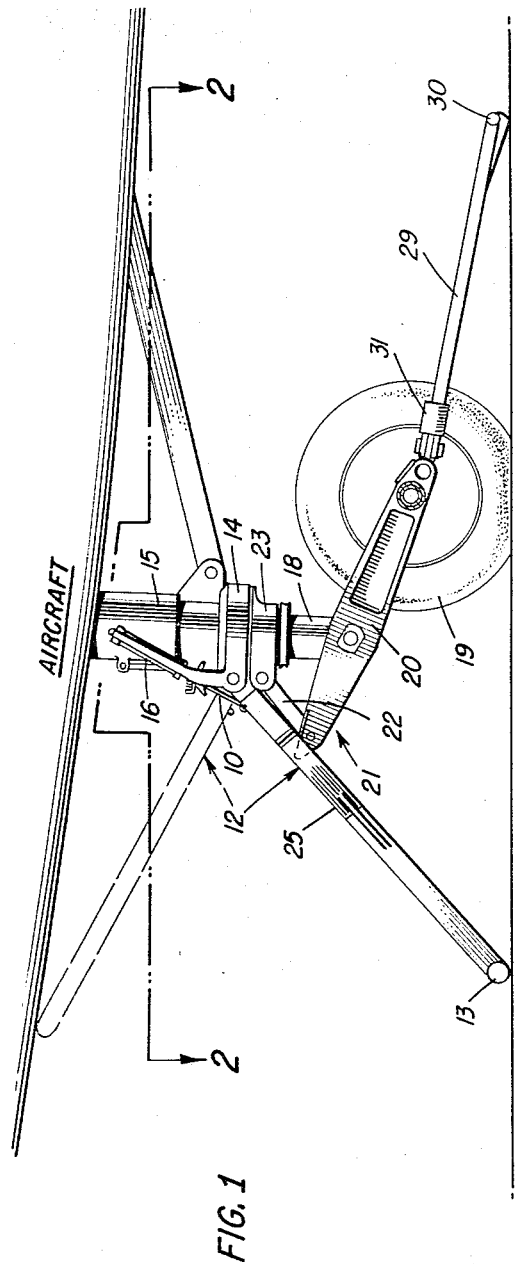
FIG. 1 is a side elevation of a landing gear constructed in accordance with the instant invention.
Figure 2:
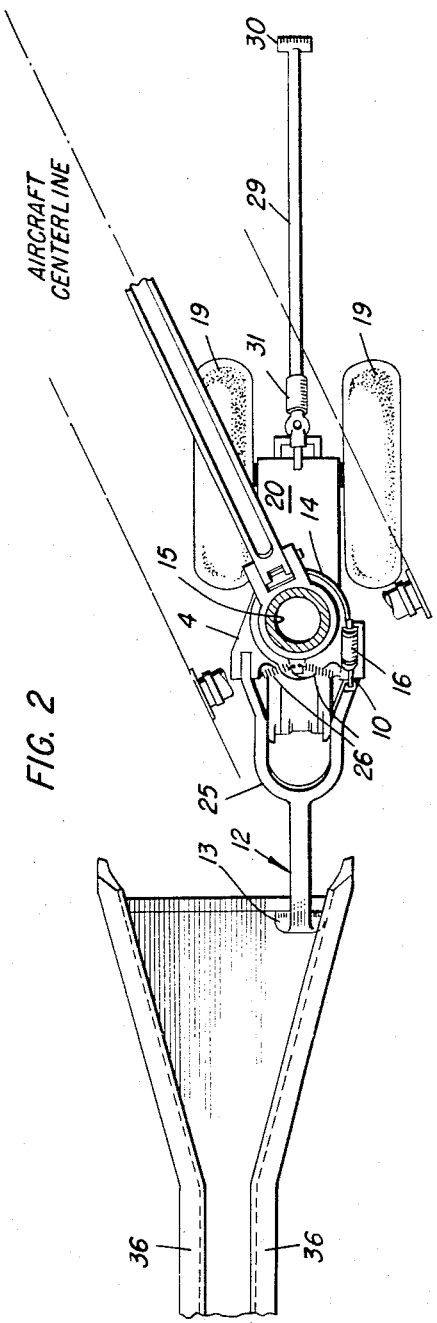
FIG. 2 is a plan view taken along line 2—2 of FIG. 1 showing the launch bar engaging the catapult approach guide bars.

As shown in the figures, this invention relates to catapult launch bar mechanisms for use on carrier based aircraft. Launch bar 12 has an end 13 which mates with the shuttle of the catapult, and is pivotally connected to a launch bar swivel collar 14 which is rotatably mounted upon the nose gear support strut 15 of the aircraft. Launch bar 12 is movable between a stowed position and an engaged position by means of a hydraulic actuator 16, which is preferably spring loaded to return the launch bar to the upper position upon release of hydraulic pressure. Referring particularly to FIG. 2, hydraulic fluid under pressure is supplied to cylinder 16 from pressure line P and returns to a supply tank through line T. A three-position valve controls the operation of the cylinder 16 by selectively opening and closing the lines P and T. The valve could be, for example, a sliding block with holes drilled so that lines P and T are open or shut as desired in each of the three positions. In FIG. 6, position a would correspond to the normal stowed position of the launch bar so that P and T are both isolated from the cylinder 16. To lower the launch bar, solenoid SOL is actuated by conventional interlocked three-positions switches S1 and S2 to move the valve 37 to position b. In this position, line P is opened and line T is closed. The pressure in line P lowers the piston 38 of hydraulic cylinder 16, thereby lowering the launch bar. Switch S1 is located in the aircraft cockpit so that it can be actuated by the pilot, while S2 is located outside the aircraft in a position to be actuated by the deck crewman. When SOL is actuated to move valve 37 to position c, line P is closed and line T is opened. This allows the spring 39 to raise the piston 38, thereby raising the launch bar. The valve 37 is then moved to position a after the launch bar is in its stowed position. The landing gear portion is constructed in the conventional manner and includes the strut 15, its supporting members, and the impact absorbing hydraulic piston 18 to which the wheel or wheels 19 are attached by means of a trailer link 20. The wheels are freely rotatable on piston 18 and may or may not be equipped with power steering. As is true in most conventional landing gears, this one contains a scissors section 21 including a connecting link 22 and a rotatable collar 23, all these being portions of the shock absorbing system, and the forward protruding portion of the scissors link forms an important part of the instant invention.

As shown, particularly in FIG 2, launch bar 12 is constructed with a yoke portion 25 of size which will accommodate the scissors section 21 of the landing gear. The launch bar also is provided with a set of centering springs 26 which are connected to main strut 15 and serve as a means for automatically centering the bar when yoke 25 has been disengaged from the scissors section 21. Attached to the rear of landing gear element 20 is a holdback bar 29 including a section 30 for engaging the holdback lug on the deck of the aircraft, and a frangible link 31 which will sever at the proper applied pressure in order to release the aircraft at the optimum moment.

Figure 3:
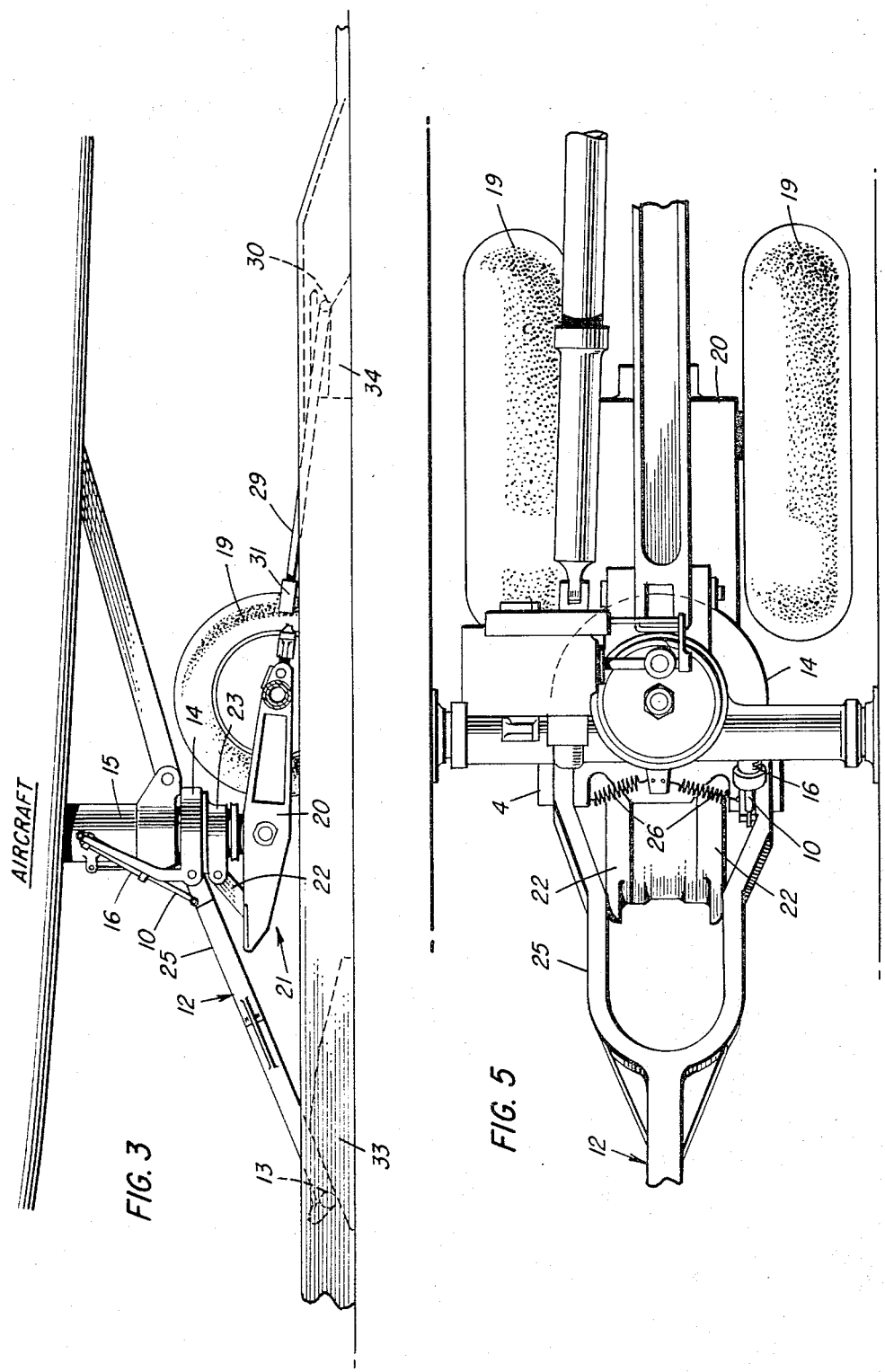
FIG. 3 is a side elevation of the apparatus at the moment of aircraft launch.

In FIG. 3 the apparatus of the instant invention is shown with the aircraft at the moment of the breaking of frangible link 31 and the commencement of the launch. It can be seen here that element 13 of launch bar 12 has engaged the catapult shuttle 33 and is acting to pull the aircraft along the catapult track. Similarly, holdback bar 29 has been engaged in holdback lug 34 which is fixedly attached to the deck of the carrier. Holdback bar 29 will be retained on the deck of the carrier but a portion of the frangible release lug is retained with the nose gear. Other hardware that is necessary for optimum use of the instant invention is a set of guide rails 36 fixedly attached to the deck of the carrier in such a manner as to form a guide channel to the catapult shuttle 33. The interaction of guide rails 36 with launch bar 12 will hereinafter be explained.

The operation of the instant device is as follows: It must be borne in mind at the outset that collar 14, upon which launch bar 12 is mounted, is freely rotatable, as is hydraulic actuator 16, upon the nose wheel main support strut 15. In addition, the wheel section carried by element 20 and supported by hydraulic piston 18, and the scissors section 21 with collar 23, are also rotatable upon the gear support strut 15. Launch bar 12 is initially in a stowed or upper position and in this position interfers in no way with the 360° swivel possible by the nose wheel or with the steering of the nose wheel. When the aircraft is approaching the catapult, launch bar 12 is lowered to a position where element 13 touches the deck by means of the hydraulic cylinder 16, which can be controlled either by the pilot or by the deck crewmen. Launch bar 12 is lowered in such a manner and at such a moment as to have yoke portion 25 fit over and engage the forward protruding scissors portion 21 of the lower nose gear elements. It is to be noted that when launch bar 12 is in such a position, even though yoke 25 engages the swiveling portion of the landing gear, the wheels can still be fully rotated either by movement of the aircraft or by the power steering unit since launch bar 12 is freely rotatable upon collar 14 on the main landing gear strut 15. Holdback bar 21 is attached with frangible element 31 in place and simply drags along behind the landing gear. The aircraft is guided such that launch bar 13 contacts the guide bars 36 mounted on a flight deck. When this happens it is seen that with launch bar yoke 25 engaging the scissors portion of the landing gear, it will act to steer the front wheels of the aircraft in response to the action of end 13 of the launch bar with guide rails 36. In this way the aircraft is quickly and expeditiously guided into position on the catapult. Once end 13 of the launch bar 12 gets into the throat provided by guide bars 36, the aircraft should be in a proper position for launch and as it continues forward in its taxiing, element 13 drops into the engagement slot in shuttle 33 of the catapult. At this same moment the holding portion 30 of holdback bar 29 is in position to engage the holdback on the flight deck 34. The aircraft is launched by means of catapult shuttle 33 when the frangible portion 31 of the holdback bar breaks in a normal manner. Once the aircraft has left the deck the spring loaded portion of a hydraulic lowering element 16 for launch bar 12 causes the bar to be retracted to the stowed position and, when the landing gear is retracted, launch bar 12 is simply taken up into the gear well with the landing gear. Centering springs 26 provide that when the launch bar 12 is disengaged from the scissors portion of the landing gear, it is centered with respect to the aircraft centerline for retraction. It is to be understood that the yoke 25 engages the forward portion 21 of the scissors element when the landing gear is subject to the normal loading due to the weight of the aircraft. Additional loadings, such as those experienced during take-off, may lower the scissors element sufficiently to free it from engagement with the launch bar, as shown in FIG. 3.

It is thus seen that the instant invention provides a simple means for effecting aircraft launch by catapult and also provides a quick and effective means for steering the aircraft into the launch position on the catapult. It is compatible with existing types of landing gear, does not interfere with the rotation of the nose wheel either by aircraft movement or by the power steering unit, and it stows with the landing gear without any further modifications thereto. This fixed element system is not prone to misalignment or misinstallation and it is not expended on each launch as is the catapult bridle which has been used in the prior art. In addition, by having both the launch bar and the holdback means connected to a single portion of the aircraft, longitudinal strain through the fuselage of the aircraft is eliminated. Furthermore, the installation of the launch system described herein does not necessitate modification to the aircraft, and is very easily installed in the flight deck of the aircraft carrier.

Obviously many modifications and variations of the instant invention are possible in the light of the above teachings. It is therefore to be understood that within the scope of the appended claims the invention may be practiced otherwise than as specifically described.

What is claimed is:

1. In an aircraft or the like adapted to be launched from a launch surface by a catapult, the apparatus comprising a nose gear having a generally upright thrust member;
a launch bar having a first end adapted to engage a catapult shuttle; and
means pivotally mounting said launch bar at a second end to said thrust member so that said launch bar can pivot between a stowed position and an engaged position in which said first end can engage the catapult shuttle, said means further allowing rotatable movement about said thrust member when the bar is moved a predetermined distance from the engaged position but being locked against rotatable movement with respect to the thrust member when moved closer than said predetermined distance toward the engaged position, the rotational and pivotal movements of the launch bar being in different planes, respectively.

2. The structure of claim 1 including
means for continuously biasing said launch bar to said stowed position; and
pressure-actuated means for moving said launch bar against said biasing means to said engaged position; whereby said launch bar may be moved to the engaged position and then be automatically moved to the stowed position when the action of the pressure-actuated means is terminated.

3. The structure of claim 2 wherein said nose gear further comprises
a shock absorbing means for rotatably supporting at least one wheel, said shock absorbing means being supported by said thrust member and including a scissors element pivotally attached at its middle and having a forward extending portion and a trailing portion, said wheels being mounted on said trailing portion, and
said launch bar further including a yoke portion adapted to engage said forward extending portion of said scissors element when in said engaged position,
whereby rotational movement of said launch bar while in engagement with said scissors element would cause a corresponding rotation of said wheels.

4. The structure of claim 3 and further wherein the launch surface is provided with a plurality of guide bars forming a V-shaped channel terminating at said catapult shuttle,
whereby said launch bar engages said guide bars upon approach to said shuttle and thereby steers said wheels into proper position for launch.

5. The structure of claim 4 and further wherein said launch bar is attached to said thrust member by means of a collar, and includes centering means acting between said launch bar and said thrust member for biasing said launch bar toward alignment with the aircraft centerline.

6. The structure of claim 5 and further comprising control means operable from either within or without the aircraft controlling said pressure actuator means thereby causing said launch bar to be moved to said engaged position.

References Cited

UNITED STATES PATENTS

| | | | |
|---|---|---|---|
| 2,777,650 | 1/1957 | Fosness et al. | 244—63 |
| 2,862,682 | 12/1958 | Davies | 244—63 |
| 2,942,805 | 6/1960 | Zimnoch | 244—63 |
| 3,155,345 | 11/1964 | Paysen et al. | 244—63 |
| 3,178,132 | 4/1965 | Wood et al. | 244—63 |

MILTON BUCHLER, *Primary Examiner.*

P. E. SAUBERER, *Assistant Examiner.*